(12) United States Patent
Taube et al.

(10) Patent No.: US 7,362,738 B2
(45) Date of Patent: Apr. 22, 2008

(54) METHOD AND SYSTEM FOR DELIVERING INFORMATION TO A USER

(75) Inventors: Arnold Albert Taube, Geneseo, IL (US); Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 215 days.

(21) Appl. No.: 11/199,857

(22) Filed: Aug. 9, 2005

(65) Prior Publication Data

US 2007/0036117 A1 Feb. 15, 2007

(51) Int. Cl.
*H04Q 7/24* (2006.01)
(52) U.S. Cl. .............. 370/338; 370/328; 370/395.3
(58) Field of Classification Search .............. 370/338, 370/292, 326, 363, 342, 395.3, 415, 429; 455/66.1, 260, 550, 425; 705/14
See application file for complete search history.

(56) References Cited

U.S. PATENT DOCUMENTS

| | | | |
|---|---|---|---|
| RE31,023 E | 9/1982 | Hall | 47/1 R |
| 5,867,817 A * | 2/1999 | Catallo et al. | 704/255 |
| 5,884,224 A | 3/1999 | McNabb et al. | 702/2 |
| 6,396,461 B1 | 5/2002 | Lewis et al. | 345/7 |
| 6,650,877 B1 | 11/2003 | Tarbouriech et al. | 455/186.1 |
| 6,724,354 B1 | 4/2004 | Spitzer et al. | 345/32 |
| 6,912,433 B1 * | 6/2005 | Chong et al. | 700/110 |
| 7,031,922 B1 * | 4/2006 | Kalinowski et al. | 704/271 |
| 2002/0068600 A1 * | 6/2002 | Chihara et al. | 455/550 |
| 2002/0147642 A1 * | 10/2002 | Avallone et al. | 705/14 |
| 2003/0003907 A1 * | 1/2003 | Lai et al. | 455/425 |
| 2003/0231164 A1 * | 12/2003 | Blumer et al. | 345/159 |
| 2004/0189720 A1 * | 9/2004 | Wilson et al. | 345/863 |
| 2004/0203408 A1 * | 10/2004 | Wen et al. | 455/66.1 |
| 2004/0233930 A1 | 11/2004 | Colby, Jr. | |
| 2005/0010787 A1 | 1/2005 | Tarbouriech | 713/185 |
| 2005/0063524 A1 | 3/2005 | McKibben et al. | |

FOREIGN PATENT DOCUMENTS

| WO | WO 03/094150 A1 | 11/2003 |
|---|---|---|
| WO | WO 2005/001745 A2 | 1/2005 |
| WO | WO 2005-006723 A1 | 1/2005 |

OTHER PUBLICATIONS

Microvision, Inc. Nomad Expert Technician System [online]. [Retrieved on Aug. 5, 2005]. Retrieved from the Internet: <URL: http://www.microvision.com/nomad>.
The MicroOptical Corporation. Product Brochure for SV-6 PC Viewer and SV-3 Instrument Viewer [online]. [Retrieved on Aug. 5, 2005]. Retrieved from the Internet: <URL: http://www.MicroOptical.net/DOCS/SV-3-6.pdf.>.

* cited by examiner

*Primary Examiner*—Tan Trinh

(57) ABSTRACT

A system and method for delivering information to a user (e.g., a worker) comprises equipping a user with a data processing device associated with a portable display. A particular location or context of the user is determined. A display automatically displays information to the user based on at least one of the location of use and the determined context.

18 Claims, 6 Drawing Sheets

| Input Data | Output Data |
|---|---|
| First Location Data | First Information Package |
| Second Location Data | Second Information Package |

Fig. 7

| Input Data | Output Data |
|---|---|
| First Location Data<br>First Workpiece Identifier | First Information Package |
| Second Location Data<br>First Workpiece Identifier | Second Information Package |
| First Location Data<br>Second Workpiece Identifier | Third Information Package |
| Second Location Data<br>Second Workpiece Identifier | Fourth Information Package |

Fig. 8

| Input Data | Output Data |
|---|---|
| First User Identifier<br>First Workpiece Identifier | First Information Package |
| Second User Identifier<br>First Workpiece Identifier | Second Information Package |

Fig. 9

| Input Data | Output Data |
|---|---|
| First Location Data<br>First User Identifier<br>First Workpiece Identifier | First Information Package |
| Second Location Data<br>Second User Identifier<br>Second Workpiece Identifier | Second Information Package |

Fig. 10

METHOD AND SYSTEM FOR DELIVERING INFORMATION TO A USER

FIELD OF THE INVENTION

This invention relates to a method and system for delivering information to a user.

BACKGROUND OF THE INVENTION

A user may be equipped with a portable data processing device to facilitate the performance of a task. Although such a portable data processing device may be equipped with a keypad, keyboard or hand gesture recognition interface, the user may want to keep his hands free to perform the task or for his convenience. Speech recognition may be used as an alternate form of inputting information into a portable data processing device, but can be unreliable and cumbersome. Speech recognition is susceptible to inaccuracies from background noise or variation in speech patterns of the speaker. Speech recognition may require prodigious computational resources that tend to deplete battery life over an unacceptably short time period in a mobile environment. Accordingly, there is a need for facilitating user interaction with a portable data processing system that overcomes the aforementioned problems.

SUMMARY OF THE INVENTION

A system and method for delivering information to a user (e.g., a worker) comprises equipping a user with a data processing device associated with a portable display. A particular location or context of the user is determined. A display automatically displays information to the user based on at least one of the location of use and the determined context.

BRIEF DESCRIPTION OF THE DRAWINGS

FIG. 7 through FIG. 10, inclusive, illustrate various input-output data sets that may be referenced by the contextual manager.

DESCRIPTION OF THE PREFERRED EMBODIMENT

Figure 1:
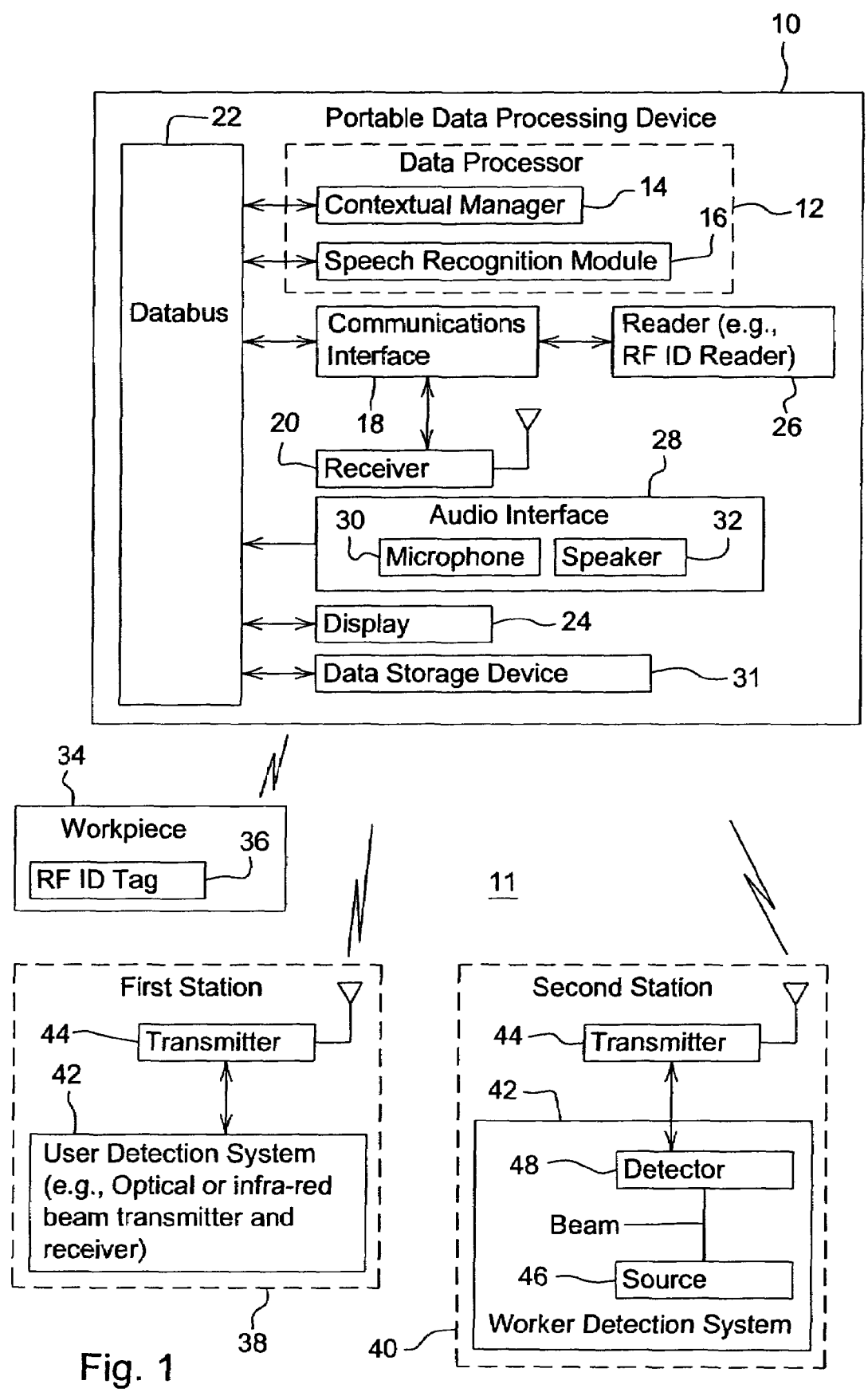
FIG. 1 is a block diagram of a first embodiment of a system for delivering information to a user.

FIG. 1 is a block diagram of a system 11 for delivering information to a user (e.g., a worker). The system 11 comprises a portable data processing device 10, which may read a tag 36 (e.g., radio frequency identification tag, bar code or optical tag) associated with a workpiece 34. A transmitter 44 associated with a worker detection system 42 may transmit a status message (e.g., location data) to the portable data processing device 10.

The portable data processing device 10 comprises a data processor 12, a data storage device 31, a communications interface 18, an audio interface 28, and a display 24 coupled to a databus 22. The data processor 12 may comprise a contextual manager 14 and a speech recognition module 16. A receiver 20 and a reader 26 may be coupled to the communications interface 18 or to the databus 22. The reader 26 may be used to read and collect a workpiece identifier from a tag 36.

The audio interface 28 may further include voice operated switch or relay. The output of the microphone 30 may be amplified and forwarded to the speech recognition module 16 for further processing. In one embodiment, the microphone 30 may comprise a noise canceling, directional transducer to promote improved reliability of speech recognition processing. The display 24 may comprise a heads-up display, a wearable display, or another portable display (.e.g., a color, monochrome, or grey-scale liquid crystal panel) that is integrated into eyeglasses, goggles, or visor.

In one embodiment, the worker detection system 42 comprises a source 46 and a detector 48. The source 46 may transmit an optical, infrared, near-infrared, ultraviolet, or other signal toward a detector 48 in a radiation pattern (e.g., electromagnetic beam). If the electromagnetic beam or radiation pattern is blocked by the user's entry or presence in a work station zone or at a work station, the detector 48 detects the absence of the beam or radiation pattern and transmits a status message (e.g., location data, station identifier, or an operator present indicator) to the receiver 20 of the data processing device 10. The contextual manager 14 may designate the user as present at a respective station (e.g., first station 38 or second station 40) corresponding to the transmitted status message. The contextual manager 14 may store the user's status (e.g., present at a particular work station) in a user status log or user database in the data storage device 31.

The contextual manager 14 may retrieve or facilitate display of an information package (on the display 24) that is relevant or pertinent to the user for the work station based on one or more of the following: (1) a workpiece identifier associated with the workpiece 34, (2) a user identifier associated with a user or worker, (3) a device identifier associated with the portable data processing device 10 or a similar device, (4) a particular work station where a particular user is located, (5) user location data (e.g., user coordinates), (6) a task identifier or general task to be performed, (7) time of arrival of the workpiece at a work station, and (8) duration of the workpiece at the work station. Any of the above items may be grouped as input data that is linked or associated with corresponding output data. Here, the output data comprises respective information packages corresponding to the input data. Reference input data and output data may be stored as records, files, or other data structures in the data storage device 31.

The information package may comprise task data, information on the tasks to be performed at a particular work station, a menu of tasks to be performed at a particular work station, information on the workpiece 34 presented to a user, or a menu of tasks based on the particular workpiece 34 and work station. The data processing device 10 may retrieve the information package from data storage 31 and display the information package (e.g., task data or procedure data) to a user on the display 24.

The task data may comprise a sequence of steps, a flow chart, a troubleshooting chart, or instructions in sequential order or logical order to complete at task or procedure. The task may relate to manufacturing, assembly, disassembly, inspection, testing, diagnosis or repair of a particular workpiece or another item presented to a user. The task data may be updated or revised based on the lapse of time, the movement of the workpiece from one work station to another, or another triggering event. In an alternate embodiment, the data processing device 10 may keep track of the progress of certain steps or a sequence of task data. Further, the data processing device 10 may determine if an earlier step or earlier task has been successfully completed prior to initiating or displaying a subsequent or next step or next task to a user.

In one configuration, the user logs onto the portable data processing device 10 or is assigned portable data processing device 10 with a corresponding device identifier. The device identifier may be associated with a profile of the hardware and software installed in the portable data processing device 10 or other capabilities or technical constraints associated with the portable data processing device 10. For example, the technical constraints may comprise the processor specifications, the processor throughput, display resolution, display size, operating system, operating system version, loaded application programs, and application program versions, among other things. The information package displayed as output data may be filtered or prepared consistent with the device identifier, or its technical constraints.

In an alternate embodiment, the transmitter 44 at each station and the receiver 20 of the portable data processing device 10 may be replaced by transceivers to allow two-way communication between each station (38,40) and the portable data processing device 10. Two-way communication may support various protocol, hand-shake schemes, and error detection schemes.

Once the information package is presented to the user on the display 24, the user may enter additional information or navigate a menu or user interface (presented on the display 24) via an audio interface 28. The information package may be associated with triggering a command in an application that is executable on a windows-based operating system, for example. The data processor 12 supports display management, screen management (e.g., display mode), data selection, menu activation, and data entry or input). The audio interface 28 comprises a microphone 30 and speaker 32. Advantageously, the speech recognition module 16 may enhance the reliability of voice recognition commands and may be improved by limiting the commands to one or more of the following: (1) a limited list of words or commands consistent with the context or (2) a limited number of menu choices or selection choices associated with the information package. The speech recognition module 16 reduces error in interpretation and misunderstanding by allowing a broad pattern for a select a list of words or limited number of commands. Thus, the portable data processing system is well suited for a portable or mobile environment of the user where it may be awkward to access a keyboard or keypad or make entries into a keyboard or keypad.

Notwithstanding the foregoing, the user may be provided with "yes", "no", "enter", "arrow" buttons, or other commands for navigating the menu or inputting information in noisy environments where speech recognition is not useful, to augment the speech recognition capabilities, or to recover from the data processing devices misinterpretation or confusion over a speech command.

Although a work site may have any number of work stations, the work site of FIG. 1 comprises a first station 38 and a second station 40. Each station is associated with a worker detection system 42. The worker station system is coupled to a transmitter 44 for communicating with the receiver 20 of the portable data processing device 10. In one example, the stations are workstations within an assembly line; if a user is present or moves to a particular station along the assembly line, the data processing device 10 displays information relevant to the operation of the station. The display of information may be limited by a security manager that restricts access to authorized users or authorized device identifiers.

The portable data processing device 10, or its constituent components, may be wearable by a user. For instance, the portable data processing device 10 may be integrated into eyeglasses, jewelry, a belt, a backpack, a carrying case, an accessory, or an article of clothing. The data processor 12, the display 24, and the audio interface 28 may comprise wearable components. The display 24 may comprise a heads-up display in which a display is integrated into goggles, a headset, eyeglasses, or a visor. Alternatively, the display 24 may be wearable as a wrist band. In an alternate embodiment, the display may also write information to the eye of the user. The audio interface 28 may support an in-ear speaker as the speaker 32.

Figure 2:
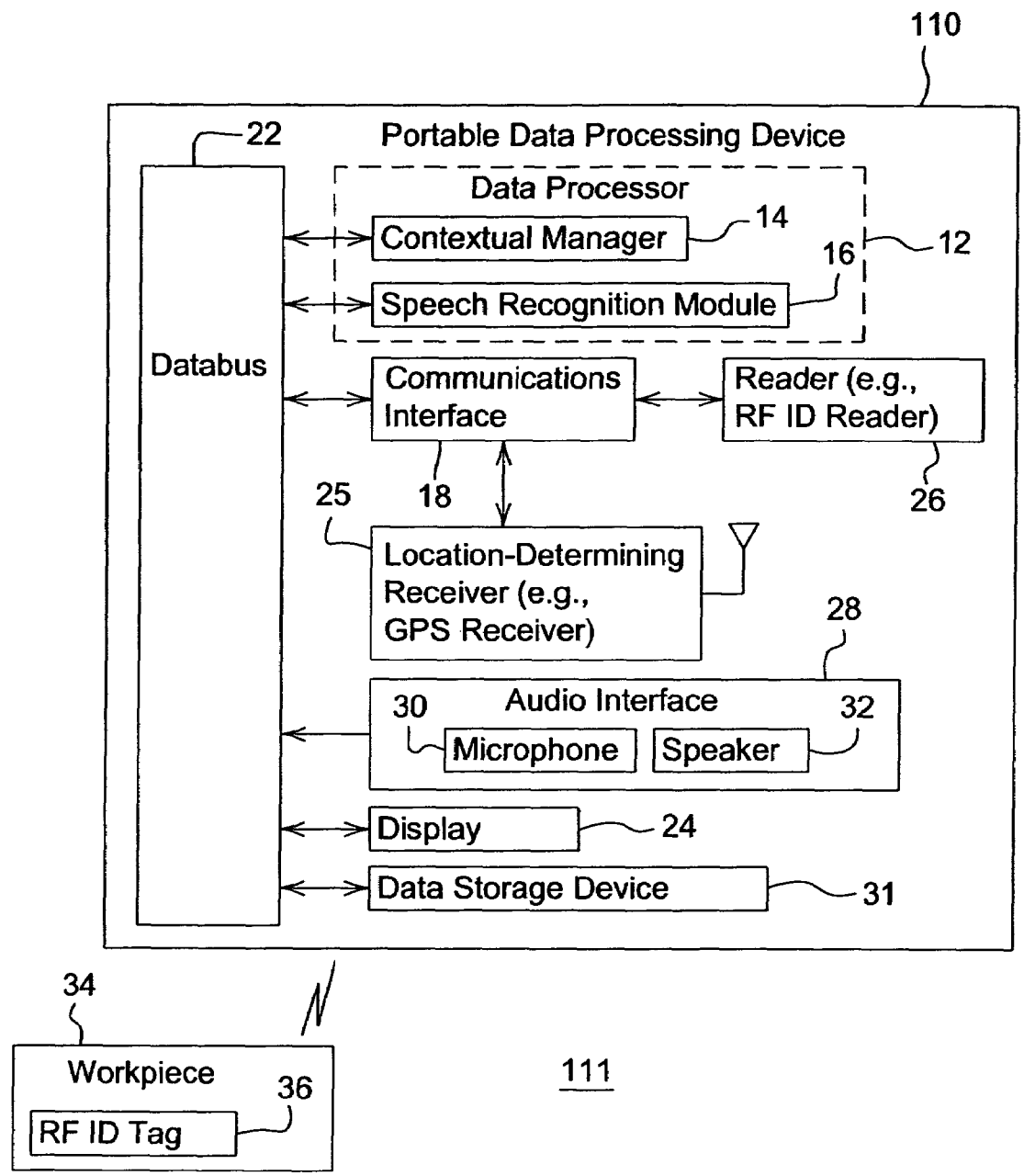
FIG. 2 is a block diagram of a second embodiment of a system for delivering information to a user.

The system 111 of FIG. 2 is similar to the system 11 of FIG. 1, except the receiver 20 is replaced with a location-determining receiver 25 (e.g., GPS receiver with differential correction). Further, the worker detection system 42 and transmitter 44 at the first station 38 and the second station 40 may be omitted. Like reference numbers indicate like elements in FIG. 1 and FIG. 2.

The location-determining receiver 25 provides location data (e.g., user coordinates or user location data) to the contextual manager 14. A contextual manager 14 may store or access a look-up table, chart, database, or file that contains the location data (e.g., coordinates) and corresponding information packages (to be displayed on the portable data processing device 10). A respective range of location data (e.g., a boundary expressed as location data) may be associated with a corresponding work station (e.g., first work station) or work station zone. Accordingly, either location data or work station identifiers may be associated with the delivery of corresponding information packages.

Figure 3:
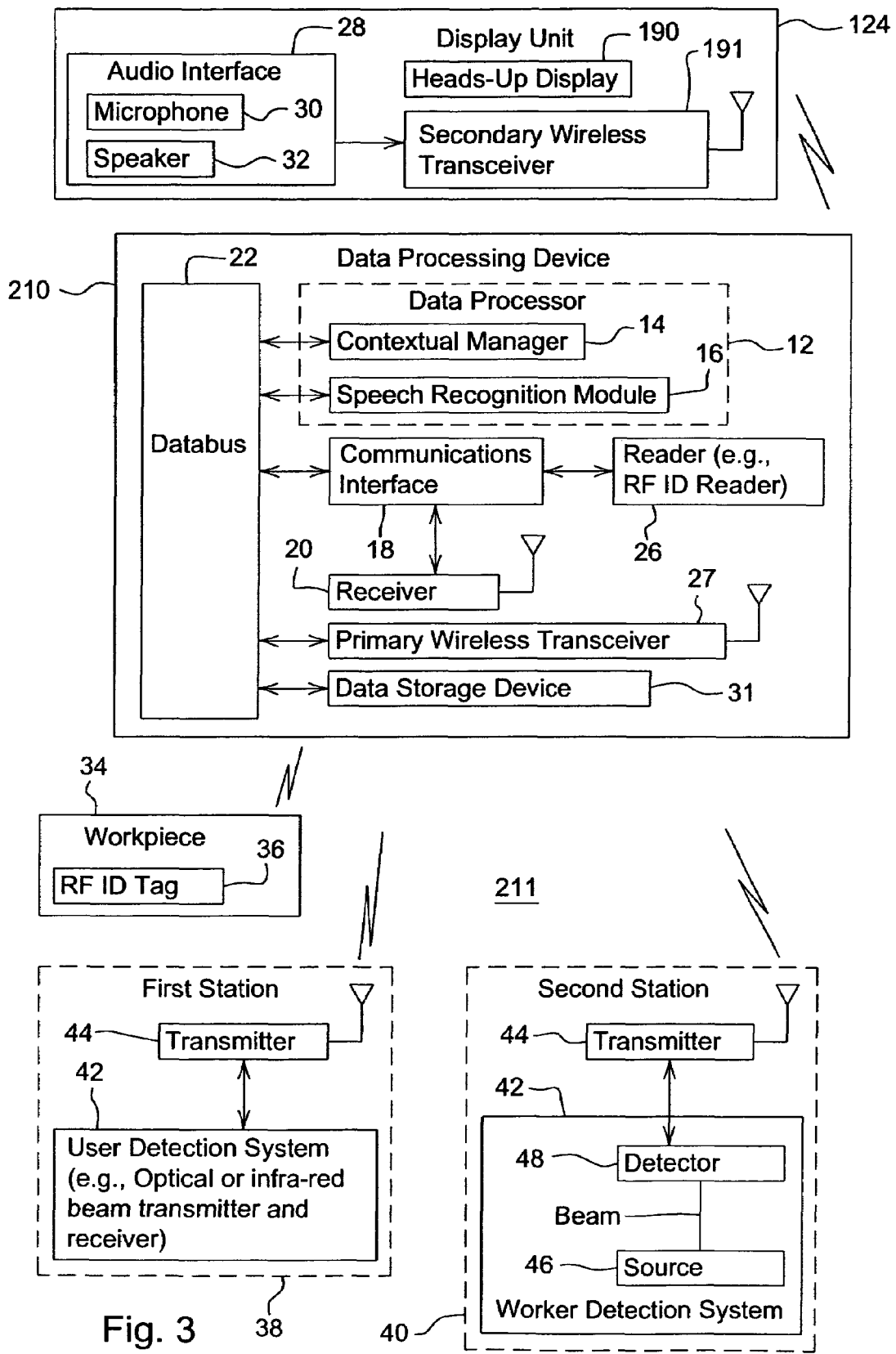
FIG. 3 is a block diagram of a third embodiment of a system for delivering information to a user.

In FIG. 3, the data processing device 210 displays a particular information package on the display 124, where the particular information package corresponds to one or more of the following: (1) a workpiece identifier (e.g., tag identifier) associated with the workpiece 34, (2) a user identifier associated with a user or worker, (3) a device identifier associated with the portable data processing device 210 or a similar device, (4) a particular work station (e.g., work station identifier) where a particular user is located, (5) user location data (e.g., user coordinates), (6) a task identifier or general task to be performed, (7) time of arrival of the workpiece at a work station, and (8) duration of the workpiece at the work station. The information package may comprise information on the workpiece 34 presented to a user, information on the tasks to be performed at a particular work station, a menu of tasks to be performed at a particular work station, or a menu of tasks based on the particular workpiece 34 and work station, for example.

The location-determining receiver 25 of FIG. 2 may provide reliable location information of a user in an outdoors setting or in a building with reliable reception of satellite signals associated with a Global Positioning System (GPS) or other satellite beacons. In contrast, the worker detection system 42 of FIG. 1 provides reliable location information of the user in buildings.

The system 211 of FIG. 3 is similar to the system 11 of FIG. 1, except the data processing device 210 replaces the display 24 of FIG. 1 with the remotely located display unit 124. The display unit 124 is coupled to the data processing device 210 via a primary wireless transceiver 27 and a second wireless transceiver 191. Further, the audio interface 28 is moved from the data processing device 10 to the display unit 124. Like reference numbers indicate like elements in FIG. 1 and FIG. 3.

The display unit 124 comprises a heads-up display 190 coupled to a secondary wireless transceiver 191. A heads-up display may comprise a liquid-crystal display that is affixed to eyeglasses or a visor so as not to obscure a majority of a field of view of a user. The liquid crystal display may be monochrome, black and white, or color with a resolution (e.g., number of pixels or vertical and horizontal lines) comparable to that of a typical or conventional computer monitor.

The data processing system 210 of FIG. 3 may be stationary configuration or a portable configuration (e.g., wearable on a user). The primary wireless transceiver communicates to the secondary wireless transceiver 191 to facilitate the display of information (e.g., an information package) on the heads-up display 190. The wireless transceivers (27, 191) support the transmission of voice commands from the microphone 30 to the speech recognition module 16 and the transmission of audio output from the data processing device 210 to the speaker 32.

The primary wireless transceiver 27 may comprise a Bluetooth transceiver, a WiFi transceiver, an ultrasonic transceiver, a microwave transceiver, an infrared transceiver, or another transceiver. Similarly, the secondary wireless transceiver 191 may comprise a Bluetooth transceiver, a WiFi transceiver, an ultrasonic transceiver, a microwave transceiver, an infrared transceiver, a transceiver compatible with the 802.11 standard, or another transceiver that is compatible with the first transceiver.

Bluetooth is a wireless protocol that allows short range communications (e.g., about 10 meters to 50 meters) between two or more devices (e.g., between a computer and a peripheral device). Bluetooth is typically used to replace wire connections between devices. Bluetooth generally operates over the microwave frequency band (e.g., 2.45 GHz) with spread spectrum, frequency hopping modulation, but may be adapted to other frequency ranges or modulation schemes. WiFi is a wireless networking standard, which may be referred to as 802.11 compliant. WiFi transceivers may be compatible with the 802.11b and 802.11g standards and transmit at 2.4 GHz with orthogonal frequency division multiplexing. The 802.11b compliant WiFi is theoretically capable of transmitting at a maximum rate of 11 Mbps (Megabits per second), whereas the 802.11a and 802.11g are theoretically capable of transmitting a maximum rate of 54 Mbps. The transmission capacity or bandwidth of Bluetooth is lesser than that of WiFi, such that Bluetooth generally provides slower display updates and lower display resolutions than WiFi would. The 802.11 standard is a wireless standard adopted by the Institute of Electrical and Electronics Engineers (IEEE).

The heads-up display 190 may be integrated into eyeglasses, goggles or a visor, for instance. The heads-up display 190 may be packaged such that no cables or wires interconnect the display unit 124 to the data processing device 210. Accordingly, the data processing device 211 of FIG. 3 may be stationary (e.g., a desk-top or main-frame computer) or portable, whereas the data processing device 10 of FIG. 1 and 110 of FIG. 2 is generally portable. The elimination of wire connections between the display unit 124 and the data processing device 210 tends to facilitate greater safety, maneuverability, and agility of user in performing tasks while receiving information from the data processing device 210. Further, there is reduced likelihood of the service technician being entangled, tripped, snagged, endangered, or otherwise inconvenienced or injured by cords or wires.

The data processing device 210 may be interconnected into a local area network (LAN), a wide area network (WAN), the Internet, a wireless network, or another network for accessing databases or other information via the communications interface 18. For instance, if the workpiece identifiers are associated with barcode identifiers, uniform product codes (UPC), radio frequency identification tags, or other product information, the communications interface 18 may support collection or querying of such information.

Figure 4:
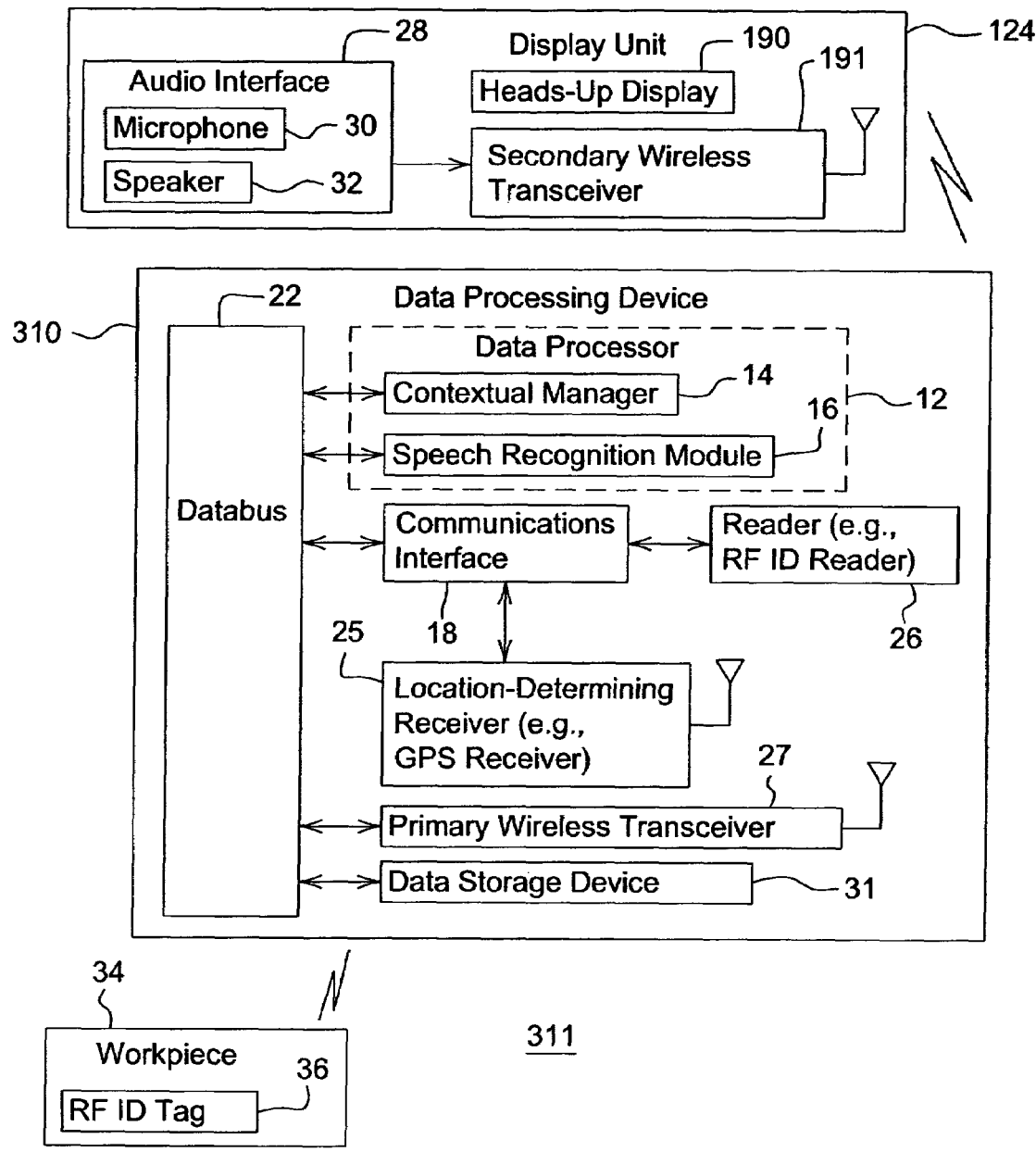
FIG. 4 is a block diagram of a fourth embodiment of a system for delivering information to a user.

The system 311 of FIG. 4 is similar to the system 111 of FIG. 2 except FIG. 4 replaces the display 24 with the remotely located display unit 124. The display unit 124 is coupled to the data processing device 310 via a primary wireless transceiver 27 and a secondary wireless transceiver 191. The display unit 124 comprises a heads-up display 190 and an audio interface 28 coupled to a secondary wireless transceiver 191. The primary wireless transceiver 27 communicates to the secondary wireless transceiver 191 to facilitate the display of information on the heads-up display 190 and the transmission of audio data or audio signals between the audio interface 28 and the data processing device 310 (e.g., the speech recognition module 16).

Figure 5:
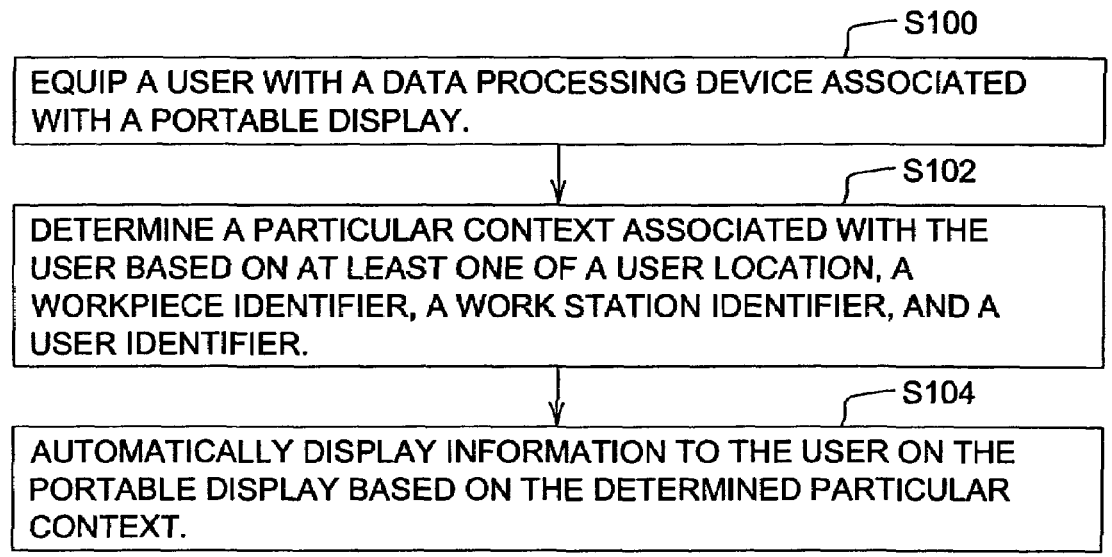
FIG. 5 is a block diagram of one embodiment of a method for delivering information to a user.

FIG. 5 discloses one embodiment of a method for delivering information to a user. The method of FIG. 5 begins in step S100.

In step S100, a user is equipped with a data processing device (10, 110, 210 or 310) associated with a portable display (e.g., a heads-up wearable display 24 or display unit 124). The data processing device (10, 110) may be mounted on or in a belt, hat, headset, a strap, a backpack or otherwise. Although any display may be used, in one configuration the display 24 or display unit 124 may be integrated into one or more lens of a pair of eyeglasses, goggles, a visor, or a headset. Further, the data processing device (10 or 110) or the display unit 124 may be associated with a speaker 32 (e.g., in-ear speaker 32) and microphone 30.

In step S102, the data processing device (10, 110, 210 or 310) or the contextual manager 14 determines a particular context associated with the user based on at least one of a user location, a workpiece identifier, a work station identifier, device identifier, and a user identifier. Step S102 may be carried out by various alternative techniques, which may be applied alternately or cumulatively. Under a first technique, the data processing device (10, 110, 210 or 310) or the contextual manager 14 determines the particular context based on location data indicative of a corresponding user location. Under a second technique, the data processing device (10, 110, 210 or 310) or the contextual manager 14 determines the particular context based on user location data of the user and a workpiece location data of a workpiece associated with the user. Under a third technique, the data processing device (10, 110, 210 or 310) or the contextual manager 14 determines the user identifier of the user and workpiece identifier associated with the use. The user identifier may be assigned to the user for security purposes and may be associated with a password to log into the data processing device (10, 110, 210 or 310) or other authentication means. Under a fourth technique, the data processing device (10, 110, 210 or 310) or the contextual manager 14 determines location data associated with the user location, a user identifier of the user, and a workpiece identifier associated with the user. Under a fifth technique, a worker detection system 42 detects the presence of a user at a particular work station and generates a status message indicative of the presence of the user for a corresponding work station identifier.

In step S104, the data processing device (10, 110, or 310) or the display (24 or 124) automatically displays information to the user on the portable display based on the determined particular context. For example, the display unit 124 or display 24 displays a menu associated with a limited number of verbal commands to negotiate the menu efficiently via a speech recognition process. The speech recognition module 16 may be tuned to accept a wider variety of reference speech patterns for a limited number of words or verbal commands than is possible with a greater number of words or verbal commands. Because fewer reference patterns may be required by limiting the available words or verbal commands, the reference verbal commands can be stored with enhanced resolution and high fidelity, without encroaching on available memory or data storage constraints. Accordingly, the above tuning and reference pattern scheme facilitates greater reliability and accuracy in voice recognition of words or verbal commands.

Step S104 may be carried out in accordance with various procedures that may be applied collectively or individually. Under a first procedure, the display 24 or the display unit 124 displays an application program at a ready state which is ready to accept a limited number of word commands or verbal commands, consistent with navigating the application program. Under a second procedure, the displayed information package represents a sequence of tasks related to at least one of manufacturing, assembly, disassembly, inspection, and testing of a workpiece associated with the workpiece identifier. Under a third procedure, if the determined particular context is based on location data associated with the user in step S102; the display unit 124 or display 24 displays an information package based on the location data. Under a fourth procedure, if the determined particular context is based on location data of the user and a workpiece associated with the user in step S102; the display unit 124 or display 24 displays an information package based on the location data and the workpiece identifier. Under a fifth procedure, if the determined particular context is based on a user identifier of the user and workpiece identifier associated with the user; the display unit 124 or the display 24 displays an information package based on the user identifier and the workpiece identifier. Under a sixth procedure, if the determined location data is associated with the user location, a user identifier of the user, and a workpiece identifier associated with the user; the display unit 124 or the display 24 displays an information package based on the location data, the workpiece identifier, and the user identifier.

After step S104, the data processing device 10 and the display unit 124 may communicate via a wireless interface. The display unit 124 may comprise a unit integrated into at least one of visor, eyeglasses, and a headset.

Figure 6:
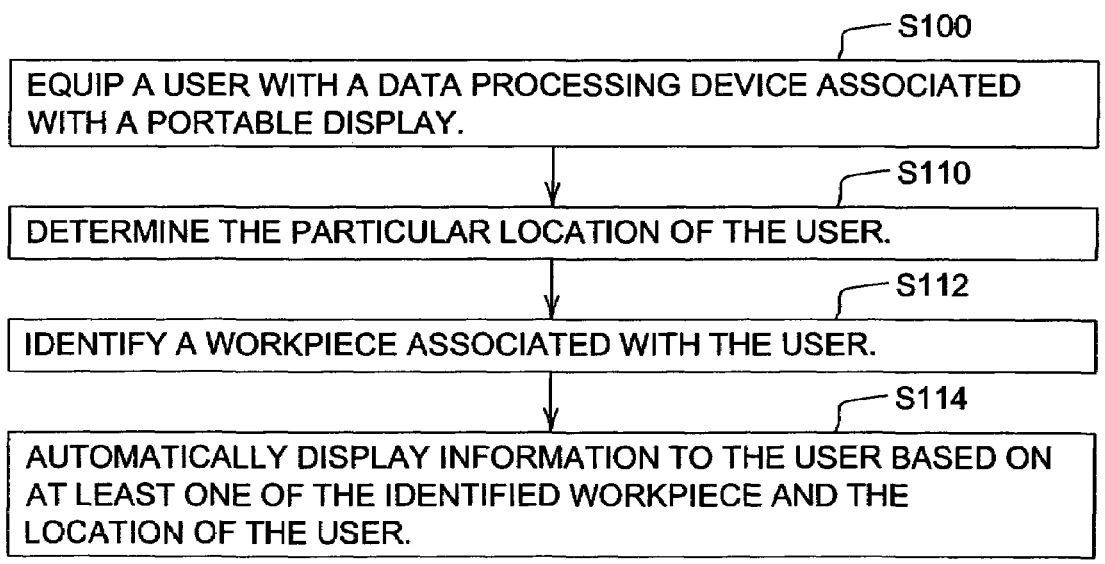
FIG. 6 is a block diagram of one embodiment of a method for delivering information to a user.

FIG. 6 discloses another embodiment of a method for delivering information to a user. The method of FIG. 6 begins in step S100.

In step S100, a user is equipped with a data processing device (10, 110, 210 or 310) associated with a portable display (e.g., display 24 or display unit 124). The data processing device (10, 110, 210, or 310) may be mounted on or in a belt, hat, headset, a strap, a backpack or otherwise. Although any display may be used, in one configuration the display 24 or display unit 124 may comprise a heads-up wearable display integrated into one or more lens of a pair of eyeglasses, goggles, a visor, or a headset. Further, the data processing device (10 or 110) or the display unit 124 may be associated with a speaker 32 (e.g., in-ear speaker) and microphone 30.

In step S110, the particular location of the user is determined. Step S110 may be carried out in accordance with various techniques, which may be applied alternately or cumulatively. Under a first technique, user detection system 42 transmits a work station identifier or particular location data to the data processing device (10 or 210) that indicates a position (e.g., coordinates) or a range of positions of a particular user (e.g., a worker). Under a second technique, a location-determining receiver 25 provides coordinates or particular location data on the location of the user to the portable data processing device (110 or 310). The location-determining receiver 25 may comprise a Global Positioning Receiver (e.g., with differential correction) collocated with the user or worn by the user.

In step S112, a reader 26 identifies a workpiece 34 or workpiece identifier associated with the user or the work station. The reader 26 may read a tag 36 associated with the workpiece 34 to identify it. In one example, the reader 26 may read an optical tag (e.g., Uniform Product Code or Bar Code label) on the workpiece 34. In another example, the reader 26 may read a radio frequency identification tag associated with the workpiece 34.

In step S114, the data processing device (10, 110, 210 or 310) or the contextual manager 14 automatically displays information to the user based on at least one of the identified workpiece 34 (e.g., workpiece identifier) and the location data of the user. The display 24 or 190 may display the information in a certain display mode which is consistent with a menu-driven communications interface 18, a windows based communications interface 18, and/or a speech navigable user interface.

The displayed information may comprise one or more of the following: workpiece identifier, status or state of the workpiece 34, status or state of a component of the workpiece 34, a work task identifier, and task data. The displayed information or task data may contain assembly instructions about assembling a component associated with the workpiece. The work task identifier may relate to disassembly, inspection, diagnostics, or repair, among other things. The context data refers to a combination of two or more of the following: the work task identifier, user location data, work station identifier, user identifier, device identifier, and workpiece identifier.

In one example, the workpiece 34 identifier comprises at least one of a model number, a serial number, and a vehicle identification number. Each workpiece 34 may be time-stamped when it arrives at the corresponding work station. The status or state of a workpiece 34 may be an arrival time at certain corresponding work station identifier, a departure time from a corresponding work station, or an elapsed time after arrival, but before departure, from a corresponding work station. Further, a status of a workpiece 34 may be entered by a user after task completion by pressing a key, scanning a tag 36, or entering a voice command.

For a given workpiece identifier, task identifier and status identifier, there may be a sequence of one or more task steps to be performed. The data processing device (10, 110, 210 or 310) is well-suited for providing information in a desired order for a sequence of tasks to be performed. The user may press a key, scan a tag 36 or enter a voice command to proceed from one task to another, or to select a desired task from a group of tasks on a menu presented to the user at a particular work station when a particular workpiece 34 is present.

If the tools and parts are tagged with tags 36 (e.g., radio frequency identification tags, bar code tags, or optical tags), the data processing device 10 may verify a checklist of tools and parts associated with the performance of a particular task.

FIG. 7 through FIG. 10, inclusive, illustrate various input-output data sets that may be referenced by the contextual manager 14 or the data processing device. The input-output data sets may be stored in the data storage device 31 for subsequent retrieval. Although the input-output data sets are organized as look-up tables, the input-output sets may be organized as files, database files, delineated text files, inverted files, or other data structures. The first information is generally distinct from the second information package, dependent upon the context implicated or suggested by the input data.

In FIG. 7, the first location data represents a particular or unique value of location data that corresponds to the user being present at a first location. Similarly, the second location data represents a particular or unique value of the location data that corresponds to the user being present at a second location. Although the first location may be defined to be coextensive or coincident with a first work station and the second location may be defined to be coextensive or coincident with the second work station, no such limitation is required.

Here, in FIG. 7, the first location data is associated with a first information package, whereas second location data is associated with a second information package. If applying the look-up table of FIG. 7, the contextual manager 14 would determine whether the location of the user substantially matches the first location data or the second location data. If the location of the user substantially matches the first location data, the contextual manager 14 would instruct the data processing device (10, 110, 210 or 310) to display the first information package. If the location of the user substantially matches the second location data, the contextual manager 14 or the data processing device (10, 110, 210 or 310) displays the second information package.

In FIG. 8, the first location data and second location data are defined consistent with FIG. 7. Further, a first workpiece is associated with a first workpiece identifier and a second workpiece is associated with a second workpiece identifier. Although the first workpiece identifier and the second workpiece identifier could be potentially identical if the first workpiece and the second workpiece represent the identical parts, components, products or goods, it may be advantageous to have codes or serial numbers incorporated into the first workpiece identifier and the second workpiece identifier that uniquely distinguish the first workpiece from the second workpiece in the event of inventory verification, product recalls, defective product returns, manufacturing changes, service change orders, or other needs.

Here, in FIG. 8, the look-up table or chart includes four possible combinations of input data. Under a first combination, the first location data and the first workpiece identifier are associated with a first information package, whereas under a second combination, the second location data and the first workpiece identifier are associated with a second information package. Under a third combination, the first location data and the second workpiece identifier are associated with a third information package. Under a fourth combination, the second location data and the second workpiece identifier are associated with a fourth information package.

If applying the look-up table of FIG. 8, the contextual manager 14 would determine whether the location of the user substantially matches the first location data or the second location data and whether the workpiece identifier matches the first workpiece identifier or the second workpiece identifier. If the location of the user substantially matches the location data and workpiece identifier, the contextual manager 14 would instruct the data processing device (10, 110, 210, 310) to display the corresponding appropriate information package set forth in the table of FIG. 8.

In FIG. 9, the first user identifier and the first workpiece identifier collectively are associated with a first information package. Meanwhile, the second user identifier and the first workpiece identifier collectively are associated with the second information package. If applying the look-up table of FIG. 9, the contextual manager 14 or data processing device (10, 110, 210, 310) would determine whether the user and workpiece identifier substantially matches the first user identifier, the second user identifier, the first workpiece identifier, or the second workpiece identifier. If the user identifier and the workpiece identifier substantially matches the first user identifier and the first workpiece identifier, respectively, the contextual manager 14 would instruct the data processing device 10 to display the first information package. However, if the user identifier and the workpiece identifier substantially match the second user identifier and the second workpiece identifier, respectively, the contextual manager 14 would instruct the data processing device 10 to display the second information package. For example, the user may comprise a service technician (e.g., as indicated by the user identifier) and the information package may comprise repair information specific to a particular model and make of a vehicle as a workpiece.

In FIG. 10, first location data, first user identifier, and first workpiece identifier collectively are associated with a first information package, whereas second location data, second user identifier, and second workpiece identifier collectively are associated with a second information package. If applying the look-up table of FIG. 10, the contextual manager 14 or data processing device (10, 110, 210 or 310) would determine whether the location of the user substantially matches (1) a first combination of the first location data, first user identifier, and first workpiece identifier or (2) a second combination of the second location data, the second user identifier, and the second location data. If user satisfies the first combination, the contextual manager 14 or data processing device (10, 110, 210 or 310) would instruct the data processing device 10 to display the first information package. If the location of the user substantially satisfies the second combination, the contextual manager 14 or the data processing device (10, 110, 210 or 310) displays the second information package.

Having described the preferred embodiment, it will become apparent that various modifications can be made without departing from the scope of the invention as defined in the accompanying claims.

We claim:

1. A method for delivering information to a user, the method comprising:

equipping a user with a data processing device associated with a portable display;

determining a particular context associated with the user based on at least one of a user location, a workpiece identifier, a work station identifier, and a user identifier;

automatically displaying information to the user on the portable display based on the determined particular context; and detecting the presence of the user at a work station and generating a status message indicative of the presence of the user for a corresponding work station identifier.

2. The method according to claim 1 wherein the determining comprises determining the particular context based on location data associated with the user; and wherein the displaying comprises displaying an information package based on the location data.

3. The method according to claim 1 wherein the determining comprises determining the particular context based on location data of the user and a workpiece associated with the user; and wherein the displaying comprises displaying an information package based on the location data and the workpiece identifier.

4. The method according to claim 1 wherein the determining comprises determining a user identifier of the user and workpiece identifier associated with the user; and wherein the displaying comprises displaying an information package based on the user identifier and the workpiece identifier.

5. The method according to claim 1 wherein the determining comprises determining location data associated with the user location, a user identifier of the user, and a workpiece identifier associated with the user; and wherein the displaying comprises displaying an information package based on the location data, the workpiece identifier, and the user identifier.

6. The method according to claim 1 wherein the displaying displays a menu associated with a limited number of verbal commands to negotiate the menu via a speech recognition process.

7. The method according to claim 1 wherein the displaying displays an application program at a ready state ready to accept a limited number of word commands.

8. The method according to claim 1 wherein displayed information package displays a sequence of tasks related to at least one of manufacturing, assembly, disassembly, inspection, and testing of a workpiece associated with the workpiece identifier.

9. The method according to claim 1 further comprising communicating between the data processing device and the display via a wireless interface, the display integrated into at least one of visor, eyeglasses, and a headset.

10. A method for delivering information to a user, the method comprising:

equipping a user with a portable data processing device associated with a wearable display;

determining a particular location of the user;

identifying a workpiece associated with the user;

automatically displaying information to the user based on at least one of the identified workpiece and the location of the user, wherein the location comprises a particular work station along an assembly line for manufacturing the workpiece as a product.

11. The method according to claim 10 wherein the determining of a particular location of the user further comprises determining a particular work station associated with the user.

12. The method according to claim 10 further comprising inputting data commands to navigate a menu provided as the displayed information.

13. A system for delivering information to a user, the system comprising:

a portable data prcocessing device associated with a display;

a location-determining receiver for determining a particular location the user;

a reader for identifying a workpiece associated with the user by reading a tag associated with the workpiece;

a transmitter for automatically displaying information to the user based on at least one of the identified workpiece and the location of the user; and a contextual manager for referencing a database, look-up table, file or other data structure, where particular location of the user is associated with a corresponding particular work station associated with the user.

14. The system according to claim 13 wherein the display comprises a wearable display integrated into at least one of eyeglasses, a visor, and a headset.

15. The system according to claim 13 further comprising a speech recognition module tuned to recognize a limited number Of words associated with the transmitted information.

16. A system for delivering information to a user, the system comprising:

a portable data processing device associated with a display;

a receiver for receiving a status message on a presence of a user at a particular work station;

a reader for identifying a workpiece associated with the user by reading a tag associated with the workpiece; and a transmitter for automatically displaying information to the user based on at least one of the identified workpiece and the status message.

17. The system according to claim 16 wherein the display comprises a wearable display integrated into at least one of eyeglasses, a visor, and a headset.

18. The system according to claim 16 further comprising a speech recognition module tuned to recognize a limited number of words associated with the transmitted information.

* * * * *